Patented Jan. 8, 1952

2,581,836

UNITED STATES PATENT OFFICE 2,581,836

ANTISTATIC TREATMENT OF ARTICLES COMPRISING VINYL RESINS AND TREATED ARTICLES

Arthur Cresswell, Stamford, Conn., assignor to American Cyanamid Company, New York, N. Y., a corporation of Maine No Drawing. Application December 30, 1948, Serial No. 68,371

9 Claims. (Cl. 117—138.8)

This invention relates to the treatment of shaped articles comprising vinyl resins. More particularly it is concerned with a method of conditioning a shaped article (e. g., in the form of a fiber, film, etc.) of a thermoplastic vinyl resin to lessen its tendency to accumulate static charges of electricity thereon, and with the products resulting from this treatment. The treatment is effected by applying to the shaped vinyl resin article, which in a dry state normally has a tendency to accumulate static charges of electricity thereon, a guanylurea salt of a mono-aliphatic (mono-aliphatic hydrocarbon), specifically mono-alkyl, ester of sulfuric acid, the aliphatic (aliphatic hydrocarbon), specifically alkyl, grouping of which contains from 12 to 18 carbon atoms, inclusive, e. g., guanylurea dodecyl hydrogen sulfate, guanylurea dodecenyl hydrogen sulfate, guanylurea octadecyl hydrogen sulfate, guanylurea oleyl hydrogen sulfate, etc. It is applicable to the treatment of filaments, fibers, yarns, films, woven, knitted and felted fabrics, and other articles made from or containing one or more thermoplastic vinyl resins for the purpose of eliminating substantially completely (in some cases) or materially lessening or retarding (in all other cases) the tendency of such articles to accumulate charges of static electricity thereon either during the production of the article, or in connection with subsequent finishing operations, or during the use of the article.

Vinyl resins constitute a class of materials which develop or tend to develop an electrostatic charge upon their surfaces when fibers or other articles made therefrom are subjected to friction during their production, and during processing or fabrication of the fibers into fabrics or other articles, as well as during the use of the finished article. Various treatments have been tried or suggested in an effort to prevent or reduce the accumulation of an electrostatic charge on the surfaces of shaped articles made from vinyl resins, but to the best of my knowledge and belief none has been entirely satisfactory. For example, it was suggested prior to my invention that vinyl resins, more particularly those which contain a substantial percentage of vinyl halide combined in the molecules, be treated with a water-dispersible compound having a polyalkylene polyamine nucleus, which nucleus has an average molecular weight of at least 300, or with a water-dispersible polyethylene imine having an average molecular weight of at least 300, in order to prevent or retard the accumulation of charges of static electricity upon the surfaces of filaments, fibers, yarns and various fabrics and other articles made from or containing such resins. Such compounds are relatively expensive and do not completely meet the requirements of the trade.

The present invention is based on my discovery that filaments, fibers, yarns, films and other shaped articles composed of or containing a vinyl resin, more particularly a thermoplastic vinyl resin, e. g., polyacrylonitrile, copolymers of acrylonitrile and a different vinyl compound such, for instance, as vinyl chloride, copolymers of vinyl acetate and vinyl chloride, etc., can be conditioned so as to obviate or minimize their tendency to accumulate static charges of electricity thereon by treating them as briefly described in the first paragraph of this specification and more fully hereafter. These results, for which I have no theoretical explanation and which were wholly unobvious and unpredictable, are obtained without detrimentally affecting the color, tensile strength, elasticity, flexibility, chemical resistance, bacterial and fungal resistance, and other valuable properties of the vinyl resin, or without rendering the vinyl resin article in any way unsuited for its intended purpose.

The guanylurea salts of mono-aliphatic (mono-aliphatic hydraocarbon) esters of sulfuric acid which are used in carrying my invention into effect may be represented by the formula I
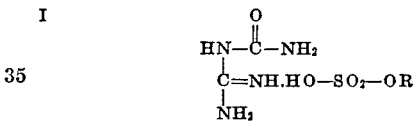

where R represents an aliphatic hydrocarbon radical, more particularly such a radical which contains at least 12 carbon atoms and, advantageously, not more than 18 carbon atoms. Illustrative examples of radicals which R in the above formula may represent are dodecyl, tetradecyl, hexadecyl (cetyl), octadecyl, dodecenyl, tetradecenyl, hexadecenyl, octadecenyl (including oleyl), etc. These guanylurea salts of monoaliphatic esters of sulfuric acid may be prepared, for example, by effecting reaction between equal molar ratios of dicyandiamide and sulfuric acid in the presence of at least 1 mole of a primary or secondary alcohol having an aliphatic grouping corresponding to that which is desired in the final compound, as is more fully described in Jayne and Day Patent No. 2,286,364. In producing the unsaturated derivatives, the reaction advantageously may be carried out at a low temperature.

The anti-static agents comprising one or more of the above-described guanylurea salts appear to be specific to vinyl resins in obviating or minimizing the tendency of the latter to accumulate static charges of electricity, since they were found to be ineffective in producing this result when applied to other shaped synthetic materials, more particularly cellulose acetate, rayon fibers and nylon fibers.

Illustrative examples of vinyl resins to which the anti-static agents employed in practicing the present invention are applicable include vinyl resins produced by the conjoint polymerization of a vinyl halide, e. g., vinyl chloride, with a vinyl ester of an aliphatic acid, e. g., vinyl acetate. Such resins are more fully described in, for example, Rugeley et al. Patent No. 2,161,766, and generally contain about 50% to about 95% by weight of combined vinyl halide in the copolymer, the remainder being a vinyl ester of an aliphatic acid. Examples of other vinyl resins to which the present invention is applicable include those formed by the conjoint polymerization of a vinyl halide, e. g., vinyl chloride, with a nitrile of an unsaturated acid, e. g., acrylonitrile, methacrylonitrile, etc.; polyvinyl chloride and other polyvinyl halides, as well as resins produced by the halogenation (e. g., chlorination) of such polyvinyl compounds; resins produced by the chlorination of copolymers of a vinyl halide with a vinyl ester of an aliphatic acid; resins produced by the conjoint polymerization of vinyl chloride or other vinyl halide with an N-alkylated imide derivative of an aliphatic acid, e. g., N-butyl maleimide; and resins produced by the conjoint polymerization of a vinyl halide, a vinyl ester of an aliphatic acid and maleic acid.

The preferred thermoplastic vinyl resins which are subjected to treatment in accordance with my invention are those in which the vinyl resin contains a substantial amount of acrylonitrile, more particularly polyacrylonitrile and thermoplastic copolymers of acrylonitrile such as those obtained by polymerizing a mixture of monomers comprising mainly, that is, a preponderant proportion by weight of acrylonitrile, and preferably those in which the acrylonitrile constitutes at least about 85% by weight of the mixture of monomers. From the foregoing it will be seen that in some cases the acrylonitrile may constitute, for example, from about 55% to about 99.5% by weight of the mixture of monomers.

Illustrative examples of monomers which may be copolymerized with acrylonitrile to yield a thermoplastic polymerization product (copolymer or interpolymer) which may be subjected to an anti-static treatment as herein described are given in, for instance, my copending application Serial No. 772,200, filed September 4, 1947, now Patent No. 2,558,730 dated July 3, 1951. The polymeric and copolymeric acrylonitriles which are subjected to treatment may be of any suitable molecular weight, but ordinarily the molecular weight (average molecular weight) is within the range of 15,000 to 300,000 or higher, and advantageously is of the order of 35,000 or 40,000 to 140,000 or 150,000, as calculated from viscosity measurements by the Staudinger equation (reference: U. S. Patent No. 2,404,713).

The guanylurea salt may be applied to the thermoplastic vinyl resin by any suitable means, but preferably it is applied in the form of a liquid dispersion, more particularly an aqueous dispersion. This dispersion may contain any suitable amount of guanylurea salt, but ordinarily the salt is present in the dispersion in an amount corresponding to from about 0.5% to about 5% by weight thereof. The dispersion may be applied, for example, by immersing the fiber or other shaped article formed of or containing the vinyl resin in the dispersion, or by spraying, padding, brushing or otherwise contacting the shaped article with the dispersion. In applying the dispersion, it is preferably heated to an elevated temperature, e. g., from about 45° or 50° C. to about 95° C., or in some cases even as high as 100° C. The dispersion may be applied at room temperature (20–30° C.) or at temperatures up to 45° C., but such temperatures are less desirable because of the greater difficulty in maintaining the guanylurea salt homogeneously dispersed in water or other liquid dispersion medium. Upon drying the fiber or other shaped article at room temperature or at an elevated temperature, e. g., on heated drying rolls, the treated article has the aforementioned guanylurea salt deposited at least on the outer surfaces thereof. The amount of guanylurea salt which is present in or on the dried, treated article may vary considerably, but ordinarily it is present therein or thereon in an amount, by weight, corresponding to from about 0.2% to about 4% of the dried, untreated article.

It is not essential that the guanylurea salt be used as the sole anti-static agent or effect agent which is present in the aqueous dispersion. In some cases, however, it is advantageous to use the guanylurea salt alone, since, because of the long-chain aliphatic grouping, specifically alkyl grouping, which is present therein, it is capable of functioning both as a lubricating agent and as an anti-static agent. In other cases it may be desirable to use the guanylurea salt in conjunction with other conditioning agents which are commonly employed in finishing compositions used in treating thermoplastic vinyl resins in fiber, film or other form. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in combination with the guanylurea salt are wetting and dispersing agents of various kinds, for example, N-octadecyl disodium sulfosuccinamate, dioctyl sodium sulfosuccinate, etc., lecithin, esters of long-chain fatty acids, e. g., alkyl stearates, palmitates and oleates, more particularly the ethyl, propyl, butyl and amyl stearates, palmitates and oleates.

The finishing compositions containing an anti-static agent comprising a guanylurea salt of the kind embraced by Formula I may be applied to the shaped thermoplastic vinyl resin, for example, yarns of associated filaments of such a resin, in the course of the production of the yarn or other shaped article, or subsequent to the production of the yarn and before or after any textile operations in which such yarns are used, especially those operations which include or involve a winding operation. By applying the finishing composition in the course of producing the filaments or fibers, the application may suffice for subsequent textile operations. If desired, however, the finishing composition containing the described anti-static agent may be applied both during the process of producing the yarns as well as later when these yarns are fabricated into textile fabrics.

The guanylurea salt used in practicing my invention also may be applied to thermoplastic vinyl resins when the latter are in gelled form. For example, I may apply a liquid treating agent to a fiber in gel state, more particularly an aquagel state, and in which the solid phase comprises an acrylonitrile polymerization product, more particularly such a product which contains in the molecules thereof an average of at least about 85% by weight of combined acrylonitrile, which treating agent comprises an aqueous dispersion containing a guanylurea salt of the kind embraced by Formula I. Thereafter the thusly treated gelled fiber is dried, for example, by continuously passing the fiber over heated drying rolls as is described more fully in my copending application Serial No. 68,370, filed concurrently herewith and now abandoned in favor of my co-pending application Serial No. 73,078, filed January 27, 1949, as a continuation-in-part of said application Serial No. 68,370. Application Serial No. 73,078 has now matured into Patent No. 2,558,731 dated July 3, 1951. In this way the guanylurea salt imparts anti-static characteristics to the fiber both during and after drying thereof.

The guanylurea salts used in practicing the present invention are especially suitable for use in the treatment of water-swollen, oriented or unoriented fibers, films, etc., which have been produced as described, for example, in my copending application Serial No. 772,200, filed September 4, 1947, and in my aforementioned copending application Serial No. 68,370, as well as in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the guanylurea salt or a finishing composition containing the same to the thermoplastic vinyl resin in fiber, film or other form, and it may be applied at any suitable stage of the production of the shaped article, or during its fabrication into other forms, or to the finished, fabricated article and prior to or during its service use. For example, if the conditioning agent is to be applied to the yarn after spinning, the yarn may be brought into contact with a wick, roll or felt which has been wetted with an aqueous or other dispersion or emulsion containing the guanylurea salt. Alternatively, the liquid finishing composition containing the guanylurea salt may be applied to the vinyl resin article by immersing the article in a bath containing the same, or by spraying, brushing, coating or otherwise applying the finishing composition to the article. Examples of points during the production of a yarn at which the conditioning agent may be applied are during stretching of a wet spun yarn or fiber to orient the molecules thereof, or between any of the guides or godets or other rolls employed in the spinning process, or between the guide and the point of winding and/or twisting; or, the conditioning agent may be applied to the yarn after winding onto cones, spools, bobbins or the like; or, in the case of staple fiber manufacture, the conditioning agent may be applied to the yarn either prior to or after cutting the yarn into staple lengths.

If desired, the guanylurea salt which is deposited in or on the treated article may be allowed to remain in place during and after the production of the article in its ultimate form. Generally, however, the applied conditioning agent comprising the guanylurea salt is removed either prior to dyeing or, if it has been applied to the dyed article, prior to the sale of the article to the trade. The conditioning agent may be removed, if desired, from yarns, fabrics and the like containing the same by means of the usual aqueous scouring baths.

In order that those skilled in the art better may understand how the present invention can be carried into effect the following examples are given by way of illustration and not by way of limitation. All parts and percents are by weight.

*Example 1*

To 1 part of guanylurea octadecyl hydrogen sulfate was added 99 parts of water. By heating to boiling with stirring an opaque dispersion was obtained. On allowing this dispersion to cool to 50° C. the salt appeared to remain well dispersed in the water. A swatch of thread spun from a copolymer of 90% acrylonitrile and 10% acrylamide as described in my copending application Serial No. 772,200, filed September 4, 1947, was employed in testing this dispersion as an anti-static agent. The swatch had been air dried for several days and picked up static electricity by manual handling very readily. The swatch was worked in the dispersion of the salt at 50° C., then wrung out and dried at room temperature in front of an electric fan. It was finally heated in an oven maintained at a temperature of 60° C. for one hour. After drying, the swatch felt smoother and softer than it did before the treatment and, when stroked either with the hand or with a piece of cellulose acetate in strip form, failed to develop static electricity.

*Example 2*

To a 1% aqueous dispersion of guanylurea octadecyl hydrogen sulfate, which dispersion was prepared as described under Example 1, was added a swatch of Vinyon N fiber. (Vinyon N fiber is made from a copolymer of about 60% vinyl chloride and about 40% acrylonitrile.) This swatch of Vinyon N fiber previously had been treated ("boiled off") in an aqueous dispersion heated to a temperature of about 60° C. and containing a small amount of dioctyl sodium sulfosuccinate in order to remove any finish which may have been present on the fiber. The swatch was then thoroughly washed in water and dried at room temperature. The dry swatch became readily charged with static electricity when stroked with the hand. The dry, "boiled-off" swatch was immersed in the 1% dispersion of guanylurea octadecyl hydrogen sulfate, worked up and down in the dispersion, then squeezed and dried at room temperature. When stroked with the hand the swatch became only very slightly charged with static electricity and showed a great improvement in this respect over the dry, "boiled-off" swatch of Vinyon N fiber.

*Example 3*

This example illustrates the use of a mixture of guanylurea dodecyl hydrogen sulfate and guanylurea octadecyl hydrogen sulfate as an anti-static agent.

To a mixture of 0.5 part of guanylurea dodecyl hydrogen sulfate and 0.5 part of guanylurea octadecyl hydrogen sulfate was added 99 parts of water. The dispersion of the mixed salts was heated to 90° C. A swatch of fibers formed from a copolymer of 90% acrylonitrile and 10% acrylamide as described under Example 1 was immersed in this dispersion, worked therein by hand, squeezed and then dried at 60° C. After drying, the swatch showed no tendency to develop static electricity when stroked, although this same swatch before treatment became readily charged with static electricity when stroked.

Similar results are obtained when the above dispersion of mixed guanylurea salts is applied to a copolymer of 90% acrylonitrile and 10% acrylamide in the form of a film.

*Example 4*

A swatch of regular Vinyon thread was washed with soap solution and then with water to remove any finish that may have been present thereon. (Vinyon fiber or thread is made from a high molecular weight copolymer of about 88–90% vinyl chloride and about 12–10% of vinyl acetate.) After drying, the swatch of Vinyon thread was found to develop static electricity very readily when it was stroked either by hand or with a piece of cellulose acetate in strip form. The swatch was immersed for a few minutes in a dispersion of 5 parts of guanylurea octadecyl hydrogen sulfate in 995 parts of water. The dispersion was at a temperature of 70° C. while treating the swatch. The treated swatch was removed from the dispersion and dried. When the dried swatch was stroked by hand or with a piece of cellulose acetate in strip form, it was found that the fiber had been rendered nonstatic.

When swatches of cellulose acetate rayon and nylon were similarly treated with the same dispersion of guanylurea octadecyl hydrogen sulfate, the dried swatches still developed a static charge when stroked as above described.

*Example 5*

A sample of copolymeric acrylonitrile having an average molecular weight of 90,500 was dissolved in a 48% aqueous, neutral solution of calcium thiocyanate at 45° C. under an atmosphere of carbon dioxide in the proportion of 7 parts of copolymer to 93 parts of calcium thiocyanate solution. This copolymer was produced by polymerizing a mixture of 95% acrylonitrile and 5% methyl acrylate. The solution of copolymer was spun by extruding it at 70–80° C. through a 40-hole spinneret having hole diameters of 110 microns into a spinning bath consisting of water cooled to 0–1° C. The yarn was led through the bath for a total distance of 191.3 inches by a positively driven, submerged godet. On leaving the bath the yarn was subjected, during its travel, to a stretch of 900% in a hot water bath maintained at 98–100° C., and was finally collected on a bobbin rotating in a water spray to keep the yarn in a gel state. The yarn was 85 denier, had a wet strength of 4.5 grams per denier and a dry strength of 4.6 grams per denier. A spool of the yarn in gel state was suspended in an aqueous dispersion containing 2% of guanylurea octadecyl hydrogen sulfate and 1% of N-octadecyl disodium sulfosuccinamate, which latter was used to facilitate the dispersion of the guanylurea octadecyl hydrogen sulfate. The dispersion was maintained at 40–50° C. during the treatment. The treated yarn was continuously passed over heated, converging, drying rolls as is more fully described in my aforementioned copending application Serial No. 68,370. The dried yarn was immediately twisted and collected on a bobbin. The amount of "finish" on the treated yarn was found to be 2.2% by weight of the dried, untreated yarn.

Yarn which was treated as above described with the aqueous dispersion containing guanylurea octadecyl hydrogen sulfate was found to run cleaner on the drying rolls than the same gel yarn which had not been treated with an anti-static agent. Furthermore, the dried yarn was easier to handle since the treatment eliminated filament ballooning caused by the building up of electrostatic charges on the filaments during the processing.

Similar results are obtained when the above-described dispersion containing guanylurea octadecyl hydrogen sulfate is applied to a water-swollen or gelled film of a copolymer of 95% acrylonitrile and 5% methyl acrylate, and the treated film in gel state is then dried.

It will be understood, of course, by those skilled in the art that my invention is not limited to the particular guanylurea salts, the particular vinyl resins or the particular conditions of applying the former to the latter as given in the above illustrative examples. For example, in place of guanylurea octadecyl hydrogen sulfate or a mixture of the said sulfate and guanylurea dodecyl hydrogen sulfate, any of the other guanylurea salts (or mixtures of said salts) of the kind embraced by Formula I may be employed, e. g., guanylurea oleyl hydrogen sulfate, guanylurea dodecenyl hydrogen sulfate, guanylurea tetradecyl hydrogen sulfate, guanylurea tetradecenyl hydrogen sulfate, guanylurea hexadecyl hydrogen sulfate, guanylurea hexadecenyl hydrogen sulfate, etc., or mixtures thereof in any proportions. Guanylurea salts of mono-aliphatic hydrocarbon esters of sulfuric acid, wherein the aliphatic hydrocarbon grouping contains less than 12 carbon atoms, e. g., from 1 to 11 carbon atoms, inclusive, also have the characteristic property of imparting antistatic characteristics to thermoplastic vinyl resins, but in general their use is less desirable because, as a result of the shorter chain length of the aliphatic hydrocarbon grouping, they have less lubricating and softening effect upon the vinyl resin article. Guanylurea salts of mono-aliphatic hydrocarbon esters of sulfuric acid, wherein the aliphatic hydrocarbon grouping contains more than 18 carbon atoms, e. g., from 20 to 32 or more carbon atoms, also would be expected to have the same characteristic property of imparting anti-static characteristics to thermoplastic vinyl resins, but such salts are more costly to produce because of the higher alcohol required for their manufacture and the lesser availability and greater cost of such higher alcohols.

Likewise it will be understood by those skilled in the art that the invention is not limited to the treatment of the specific vinyl resins given by way of illustration in the foregoing examples, since, to the best of my knowledge and belief, any thermoplastic vinyl resin which in its dry state normally accumulates or tends to accumulate static charges of electricity is amenable to treatment with a guanylurea salt (or mixture of guanylurea salts) of the kind embraced by Formula I to obviate or minimize the accumulation of static charges of electricity thereon. Numerous examples of such vinyl resins have been given hereinbefore.

As has been indicated in a portion of this specification prior to the examples, the preferred vinyl resin which is subjected to treatment in accordance with this invention is polymeric acrylonitrile or copolymeric acrylonitrile containing in its molecules a substantial amount of combined acrylonitrile. Of such copolymeric acrylonitriles, I prefer to treat an acrylonitrile copolymer containing in the polymer molecules an average of at least 85% by weight of combined acrylonitrile. In such copolymeric polymerization products, the proportions of monomers in the polymerizable mixture from which the copolymers are made preferably are adjusted so that the final copolymer contains in the molecules thereof an average of at least 85% by weight of acrylonitrile (combined acrylonitrile). The expression "acrylonitrile polymerization product containing in the molecules thereof an average of at least 85% by weight of combined acrylonitrile," as used herein and in certain of the appended claims, means a polymerization product (polymer, copolymer or interpolymer or mixture thereof) containing in its molecules an average of at least 85% by weight of the acrylonitrile unit, which is considered to be present in the individual polymer molecule as the group

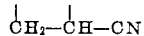

or, otherwise stated, at least 85% by weight of the reactant substance converted into and forming the polymerization product is acrylonitrile (combined acrylonitrile). Examples of monomers which may be employed in the preparation of such copolymers of acrylonitrile have been given hereinbefore.

The use of guanylurea salts of the kind embraced by Formula I in the treatment of thermoplastic vinyl resins to obviate or lessen the tendency of such resins to accumulate charges of electricity thereon has numerous advantages, among which may be mentioned their relatively lower cost as compared with others which have been suggested for this same general purpose; their ease of application (e. g., as aqueous dispersions); the fact that they do not form insoluble compounds in dispersions in hard water; their effectiveness both as anti-static agents and in lubricating and softening the shaped article in yarn or other form, whereby the treated yarn, film or other article is rendered more amenable to further processing or fabricating (e. g., weaving, knitting, etc., in the case of yarns); their compatibility with other conditioning agents commonly employed in finishing compositions used in treating fibers and other shaped articles formed of or containing a vinyl resin; their ease of removal from the treated article, when such removal appears to be desirable for subsequent processing or use of the article; their non-harmful effect upon the thermoplastic vinyl resin which is subjected to treatment; as well as other advantages.

The term "yarn" as used generically herein and in the appended claims includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein and in the appended claims includes within its meaning both monofilaments and multifilaments.

I claim:
1. The method of conditioning a shaped article comprising a thermoplastic vinyl resin to lessen its tendency to accumulate static charges of electricity thereon, said method comprising applying to the said article a volatile liquid containing a guanylurea salt of a mono-aliphatic ester of sulfuric acid represented by the formula

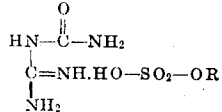

where R represents an aliphatic hydrocarbon radical containing from 12 to 18 carbon atoms, inclusive, and the amount of the said liquid containing the said salt which is applied to the said article being such that the finished article has associated therewith from, by weight, 0.2% to 4% of the said salt, based on the weight of the dry, untreated article, and drying the thusly treated article.

2. A method as in claim 1 wherein the thermoplastic vinyl resin contains in its molecules a substantial amount of combined acrylonitrile.

3. A method as in claim 1 wherein the guanylurea salt comprises guanylurea octadecyl hydrogen sulfate.

4. The method of conditioning a yarn comprising fibers of a thermoplastic product of polymerization of a polymerizable mass comprising a preponderant proportion by weight of acrylonitrile to lessen its tendency to accumulate static charges of electricity thereon, said method comprising contacting the said yarn with an aqueous dispersion containing from about 0.5% to about 5% by weight thereof of a guanylurea salt of a mono-alkyl ester of sulfuric acid represented by the formula

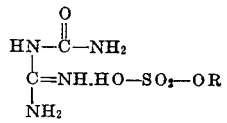

where R represents an alkyl radical containing from 12 to 18 carbon atoms, inclusive, and drying the thusly treated yarn, the amount of the said dispersion which is applied to the said yarn being such that the dried yarn has associated therewith from, by weight, 0.2% to 4% of the said guanylurea salt, based on the weight of the dried, untreated yarn.

5. The method of treating fibers of a thermoplastic product of polymerization of a polymerizable mass comprising at least about 85% by weight of acrylonitrile to impart anti-static characteristics thereto, said method comprising contacting the said fibers with an aqueous dispersion containing from about 0.5% to about 5% by weight thereof of an anti-static agent comprising guanylurea octadecyl hydrogen sulfate, and drying the thusly treated fibers, the amount of the said dispersion which is applied to the said fibers being such that the dried fibers have associated therewith from, by weight, 0.2% to 4% of the said guanylurea octadecyl hydrogen sulfate, based on the weight of the dried, untreated fibers.

6. The method which comprises applying a liquid treating agent to a fiber in gel state and in which the solid phase comprises an acrylonitrile polymerization product containing in the molecules thereof an average of at least about 85% by weight of combined acrylonitrile, said treating agent comprising an aqueous dispersion containing a guanylurea salt, a mono-alkyl ester of sulfuric acid represented by the formula

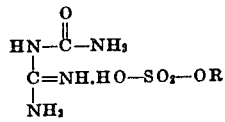

where R represents an alkyl radical containing from 12 to 18 carbon atoms, inclusive, and drying the thusly treated, gelled fiber, the said guanylurea salt imparting anti-static characteristics to the said fiber during and after drying thereof, and the amount of the said treating agent which is applied to the said fiber being such that the dried fiber has associated therewith from, by weight, 0.2% to 4% of the said guanylurea salt, based on the weight of the dried, untreated fiber.

7. A shaped article comprising a thermoplastic vinyl resin which in a dry state normally has a tendency to accumulate static charges of electricity thereon, said article having deposited at least on outer surfaces thereof a guanylurea salt of a mono-aliphatic ester of sulfuric acid represented by the formula

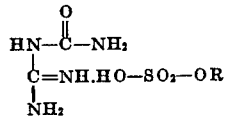

where R represents an aliphatic hydrocarbon radical containing from 12 to 18 carbon atoms, inclusive, and said guanylurea salt lessening the tendencies of the said article to accumulate static charges of electricity thereon and being associated with the said article in an amount corresponding to from 0.2% to 4% of the weight of the dry, untreated article.

8. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having deposited at least on outer surfaces thereof an anti-static agent comprising a guanylurea salt of a mono-alkyl ester of sulfuric acid represented by the formula

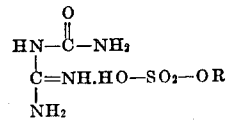

where R represents an alkyl radical containing from 12 to 18 carbon atoms, inclusive, the amount of the said guanylurea salt which is associated with the said textile corresponding to from 0.2% to 4% of the weight of the dry, untreated textile.

9. Textile fibers formed of an acrylonitrile polymerization product containing in the molecules thereof an average of at least about 85% by weight of combined acrylonitrile, said fibers having deposited at least on outer surfaces thereof a conditioning agent comprising guanylurea octadecyl hydrogen sulfate, and said guanylurea octadecyl hydrogen sulfate lessening the tendencies of the said fibers to accumulate static charges of electricity thereon and constituting from 0.2% to 4% of the weight of the dry, untreated fibers.

ARTHUR CRESSWELL.

REFERENCES CITED

The following references are of record in the file of this patent:

UNITED STATES PATENTS

| Number | Name | Date |
|---|---|---|
| 2,286,364 | Jayne et al. | June 16, 1942 |
| 2,378,724 | Oldhom | June 19, 1945 |
| 2,381,020 | Wilkes et al. | Aug. 7, 1945 |
| 2,402,767 | Morey | June 25, 1946 |
| 2,403,960 | Stoops et al. | July 16, 1946 |